Oct. 31, 1950 — J. M. BORST — 2,527,523
FREQUENCY CONTROL SYSTEM
Filed Aug. 11, 1944 — 2 Sheets-Sheet 1
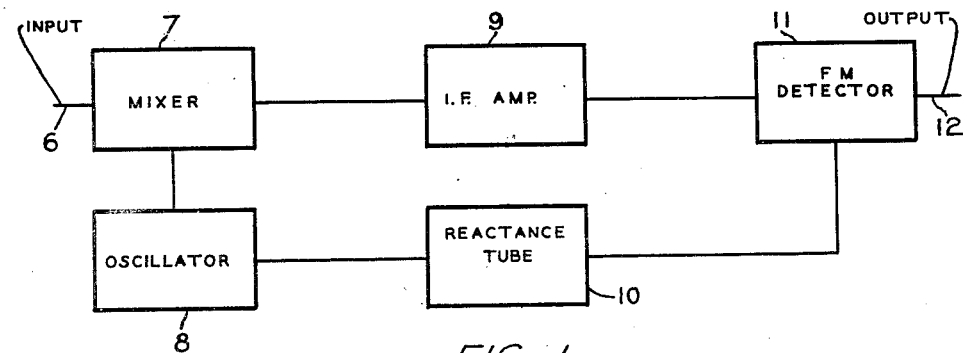
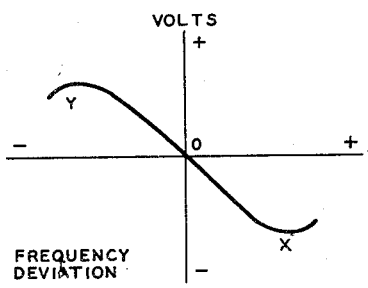
FIG. 3
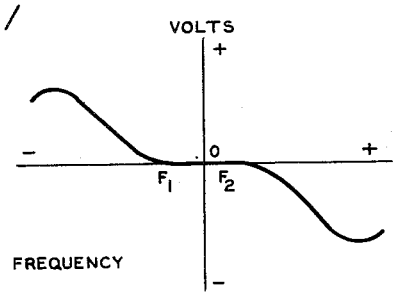
FIG. 4
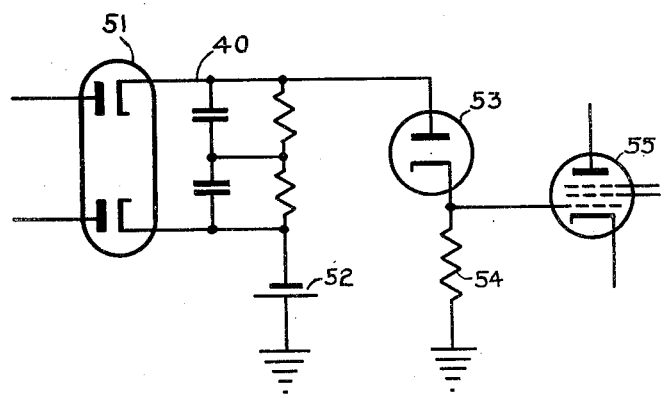
FIG. 5
JOHN MARTIN BORST
INVENTOR
ATTORNEY Oct. 31, 1950            J. M. BORST            2,527,523

FREQUENCY CONTROL SYSTEM

Filed Aug. 11, 1944                                  2 Sheets-Sheet 2

JOHN MARTIN BORST
INVENTOR

ATTORNEY

Patented Oct. 31, 1950

2,527,523

UNITED STATES PATENT OFFICE 2,527,523

FREQUENCY CONTROL SYSTEM

John Martin Borst, Brooklyn, N. Y., assignor, by mesne assignments, to Farnsworth Research Corporation, a corporation of Indiana Application August 11, 1944, Serial No. 548,964

1 Claim. (Cl. 250—20)

The present invention pertains to signaling systems, and relates more specifically to trigger devices for detecting small frequency changes.

In the communication art, devices which respond to frequency changes have usually followed the law of proportionality, square law, logarithmic law; in general, a function which was continuous. A gradual change in output current took place as the frequency was changed. In such devices the difficulty was that the detector had a very low output for small changes of frequency.

One object of the invention is to amplify the amount of frequency change in a receiving circuit, a small frequency deviation being made to cause a larger frequency deviation.

Another object of the present invention is to make the relation between input frequency and output current a discontinuous one, in that an abrupt change in output current may result from a small change in input frequency, and in such manner that a small change in frequency makes the circuit jump from one stable condition to another stable condition.

Other objects will appear as the description proceeds and as will be more particularly claimed.

One application of the invention is to frequency-modulate telegraph circuits, where the frequency difference between the "space" and "mark" wave is small. Difficulties have been experienced in obtaining a satisfactory detector when this frequency shift is small, which may occur in the future crowded frequency spectrum.

Another application is as a warning signal for the operator of any equipment, not crystal-controlled, if its frequency should wander more than the allowed minimum from the proper frequency.

Still another application is for the detection of metal objects in the field of an oscillator coil. Such metal objects will cause a shifting of frequency of the oscillator. The signal picked up by the device to be set forth herein, can be made to give a warning signal.

Other applications will be found as the invention is more fully understood.

In order that the invention may be fully understood and its advantages and applicability may be more fully appreciated, attention is invited to the accompanying drawings, in which:

Figure 1 is a block diagram of the present trigger device or apparatus.

Figure 3 illustrates the characteristic of the discriminator output voltage versus input frequency.

Figure 4 is a similar view showing the characteristic when the threshold is established by deliberately detuning the discriminator.

Figure 5 is a schematic diagram of a modified form of trigger apparatus.

Figure 2:
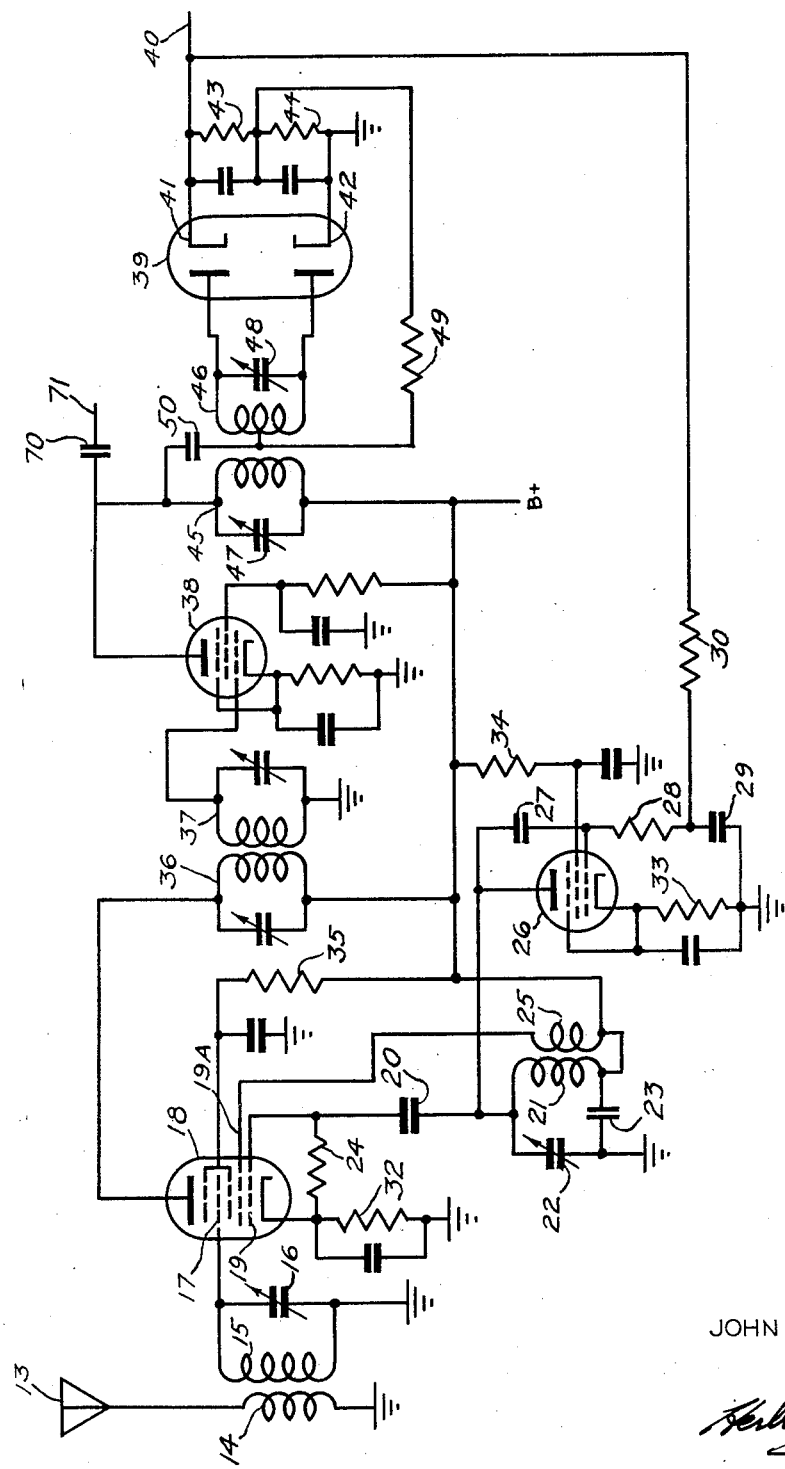
Figure 2 is a schematic diagram of a super heterodyne receiver equipped with the trigger apparatus.

As shown in Figure 1, the trigger circuit includes an input 6, leading to a mixer 7, connected respectively to an oscillator 8 and an IF amplifier 9. To the oscillator is connected a reactance tube 10, while an FM detector 11 is connected to both the IF amplifier 9 and the reactance tube 10, an output 12 being led from the FM detector 11. This constitutes broadly the trigger apparatus which is connected in a superheterodyne receiver.

In Figure 2, there is illustrated one specific embodiment of the present invention, and the same will be described as in operation. That is, the signal is picked up by an antenna 13 and the current flows through a coil 14, which induces an emf in a coil 15. A condenser 16 serves to tune the secondary to the incoming signal, and the signal voltage is applied to a control grid 17 of a frequency converter tube 18, which is a mixer and oscillator tube in one envelope.

In this tube 18, the signal is "mixed" with the local oscillator signal, the result being that the current in the plate circuit will contain, among others, components having the sum and difference frequencies of the oscillator and the incoming signal. First grid 19 and second grid 19A of the tube 18 belong to the oscillator circuit. A blocking condenser 20 is provided to prevent the high D. C. plate voltage from reaching the grid, while a coil 21 and condensers 22 and 23 comprise the oscillator tank circuit.

The blocking condenser 23 makes it possible to ground the rotor of a variable tuning condenser 22, while a resistor 24 serves to complete the grid circuit, and its value is so chosen or selected that the time constant of resistor 24 and condenser 20 is large compared to the time between two positive peaks of the oscillator voltage. The circuit oscillates by virtue of the coil 25 in the second grid (anode grid) 19A circuit which is coupled to the tank circuit in a manner so as to reinforce any changes in the coil 21. The frequency is determined by the values of condenser 22, condenser 23, and the coil 21, as well as by the reactance tube 26, and its associated circuits.

This reactance tube 26, in the particular form here shown, acts as if a condenser had been placed in parallel with the tuned circuit including condensers 22 and 23 and coil 21; and its value of capacitance depends on the transconductance of the tube 26. Thus by changing the transconductance, this apparent capacity will change and the oscillator frequency can thereby be varied.

Therefore the trigger device to detect frequency deviation consists of a superheterodyne receiver with a frequency modulation detector of any type or kind, and a reactance tube connected across the tuned circuit of the local heterodyning oscillator 8, Fig. 1. The frequency modulation detector 11, which translates frequency deviations into small D. C. voltages, is connected to the reactance tube 10 in a "regenerative" manner, so that it is opposite in polarity to the common AFC circuit connections.

The received signal beats with the local oscillator signal in the mixer and either the sum or difference frequency can be used as the intermediate frequency. After amplification at the intermediate frequency, the signal is passed on to the frequency modulation detector which gives zero output as long as the received signal is in resonance with the tuned circuits of the receiver. When there is a small deviation in frequency, this will cause a small D. C. voltage at the detector. This small D. C. voltage is applied to the reactance tube 10, Fig. 1, via a line including resonator 30 in such a manner as to make the local oscillator-freqeuncy shift in such a sense that the resulting I-F signal is still further away from the resonant frequency of the I-F amplifier. This, in turn, will cause a higher D. C. voltage at the detector, which again shifts the oscillator frequency. The process continues until a point is reached where a further increase in frequency shift no longer results in an increased D. C. voltage (working on a maximum or minimum of the detector characteristic), or when the reactance tube has reached a point where an increase in D. C. voltage at the grid no longer results in a change of injected inductance or capacitance. Thus even the slightest deviation of the received carrier will be translated into maximum response and the device works in a manner similar to a trigger circuit.

For example, let the incoming signal be at 1000 kc. and the local oscillator 8 at 1500 kc., which would make the intermediate frequency 500 kc. If the incoming signal were to change by 1 kc., so that it became 1001 kc., the I-F would become 1500—1001=499 kc. This 1 kc. deviation in the I-F signal will cause a D. C. voltage to be applied to the reactance tube in such a direction as to make the oscillator frequency shift downwardly, say to 1499 kc. The I-F then becomes 1499—1001=498 kc., and the 2 kc. difference causes a larger D. C. voltage which shifts the oscillator frequency still further downwards. This process continues until a stable limit is reached.

The reactance tube 26, Fig. 2, operates as follows: The reactance of the condenser 27 is very large compared with the resistance of a resistor 28. The phase of the current passing through the condenser 27 and the resistor 28 leads the oscillator plate voltage by almost 90 degrees. This current will cause a voltage drop across resistor 28 which is in phase with it, and this voltage drop, applied to the control grid, causes a reactance tube plate current which is in phase with the grid voltage. Therefore, the reactance tube plate current leads the oscillator plate voltage by almost 90 degress, which action is similar to that of a condenser. Variation of the potential on any element of the reactance tube will change the transconductance, and thereby change the apparent capacitance.

A condenser 29 is by-pass condenser, and in conjunction with a resistor 30 confines the oscillating current to the reactance tube. A discriminator tube 39 is connected to the resistor 30 so that its output can be made to vary the grid voltage of the tube 26. Resistors 32 and 33 are employed to limit the flow of current through the tubes 18 and 26 to a safe value, while resistors 34 and 35 are voltage dropping resistors that serve to reduce the supply voltage for the screens of said tubes.

The plate circuit of the mixer tube 18 contains the difference frequency of the oscillator and the incoming signal, such difference being selected by the double-tuned transformer 36—37 and amplified by the amplifier tube 38.

The signal current from the amplifier tube 38 is now passed through a discriminator circuit including a tube 39, which is intended to and does develope a positive potential at 40, when the frequency of the incoming signal deviates in one direction and to develope a negative potential when the frequency deviates in the other direction.

The discriminator tube 39 has two diodes 41—42, with their outputs connected differentially. The potential difference between point 40 and the ground is the difference between the voltage across resistors 43 and 44. The voltage applied to the first diode 41 is equal to the sum of the voltage drop across the coil 45 plus the voltage drop across one half of the coil 46. The voltage drop across the coil 45 plus that across the other half of the coil 46 (which is 180 degrees out of phase with that across the first half of this coil 46), is applied to the second diode 42.

When the signal frequency is the same as the resonant frequency of coil 45 and capacitor 47 and coil 46 and capacitor 48, the voltage across the two halves of the coil 46 are 90 degrees out of phase with the voltage across coil 45. The voltages at the two diode 41—42 plates are equal, and the current in the resistors 43 and 44 are equal, but in opposite directions. Then the potential difference between the point 40 and the ground will be zero.

When the signal frequency is not the same as the resonant frequency of the discriminator circuit, the voltages across the two halves of the coil 46 are not exactly 90 degrees out of phase with the voltage of coil 45. The phase difference is less than 90 degrees for one half of the coil 46 and more than 90 degrees for the other half. This results in unequal voltages being applied to the plates of the diodes, and unequal currents passing through the resistors 43 and 44. Consequently, a voltage is developed between point 40 and the ground. This voltage will be positive when the incoming signal frequency is too low, and negative, if the voltage is too high. The effect can be made to be precisely opposite in polarity, by changing the connections to the coil 46.

An impedance which may be either a resistor or an inductor, but shown here as resistor 49, serves to complete the D. C. path for the diodes, while a condenser 50 serves as the link which connects coil 45 in series with the center tap of the coil 46 for R-F current, the reactance of the condenser 50 being made negligible.

The output of the discriminator is connected to the reactance tube control element, through the resistor 30, in such a phase as to cause an exaggeration of any possible frequency deviation.

In the examples given here, the reactance tube was assumed to inject capacitance. However, it can just as easily be made to inject inductance, if the locations of condenser 27 and resistor 28 are interchanged. If this is done, the polarity of the discriminator coil 46 must then be reversed in order that the oscillator frequency will be made to shift in the right direction.

Also, when the intermediate frequency is equal to the sum of the oscillator and signal frequency, the circuit should be so connected that an upward shift in signal frequency causes the oscillator frequency to shift upwards also, and the intermediate frequency shifts upwards at an increased rate.

If the intermediate frequency is equal to the difference between signal frequency and the oscillator frequency, there are two possible cases. Either the oscillator frequency is higher, or it is lower than signal frequency. In both cases, the oscillator frequency must be made to shift downwards as the signal frequency is shifting upwards and vice versa. However, in the case of a higher oscillator frequency, the intermediate frequency becomes less when the signal frequency becomes higher, whereas in the case of a lower oscillator frequency it becomes higher. Consequently, the discriminator connections must be different for the two cases.

The polarity of discriminator connections is therefore different depending on the type of reactance tube circuit, whether the sum of difference frequency is used as intermediate frequency and whether the oscillator frequency is above or below the signal frequency when the difference frequency is utilized. Therefore, its proper polarity should be determined for each case. Under all circumstances the polarity should be such as to cause it to reinforce or exaggerate any effect due to a frequency shift of the incoming signal.

The characteristic of the discriminator output voltage versus input frequency is of the shape shown in Figure 3. When the I-F signal is slightly too high in frequency, the discriminator develops a negative voltage, and this negative voltage will increase the oscillator frequency, which beating with the incoming signal, increases the difference frequency, the intermediate frequency (assuming that the oscillator frequency is higher than the signal frequency), so that it deviates still more. The further increase in frequency of the I-F signal results in a larger negative voltage at the discriminator, and the process repeats. A cumulative action takes place which shifts the oscillator voltage until the discriminator is working at the minimum point X of its characteristic, as indicated in Figure 3.

One way of taking the output from the device is to connect a standard receiver with a heat-frequency oscillator at 71 (Fig. 2) so that it is coupled to the I-F amplifier through condenser 70. The signal applied to this receiver will then have an increased frequency shift so that it can be detected by normal means.

The output at 40 consists of D. C. voltages which change when the frequency changes. These can be made to trip a relay by means of an amplifier tube or it can serve to operate a tone keyer, well known in the art.

It will usually be impossible to receive a signal exactly at the resonant frequency of the receiver. First it will be difficult to tune in accurately; and second, even when small frequency deviations occur within the tolerance of a good crystal-controlled transmitter, would cause the cumulative effect to start. Therefore, it is necessary to arrange for a circuit which will not start cumulative action unless the frequency variation is greater than a desired minimum. One may call this condition the establishing of a "threshold."

*First method.*—Let the device normally be detuned slightly so that the I-F signal arriving at the discriminator will be either too high or too low in frequency. For the purpose of example, let it be too low. Then the cumulative action will take effect and the reactance tube will reinforce this deviation so that, finally, the discriminator will be operating at the maximum of its characteristic, point Y in Figure 3. In order to make the operating point shift to the minimum point X, the frequency deviation must be sufficiently great to work around the bend of the curve at Y to the linear portion. This alone can make the incoming frequency deviate in the other direction (too high) and make the cumulative effect start going towards the minimum of the characteristic.

*Second method.*—Another method of establishing a threshold, is to deliberately detune the discriminator so that the characteristic becomes as in Figure 4. When the frequency of the incoming signal (after heterodyning) falls between F1 and F2, the output of the discriminator is zero and the frequency can fluctuate freely between these lines. However, if the variation brings the frequency above F2 or below F1, the triggering action takes place. In this case, it can be made to work in either direction.

*Third method.*—The discriminator can be connected in conjunction with a diode, and a fixed bias, so as to establish the desired threshold as shown in Figure 5. The voltage developed across the discriminator tube 51 is in series with a battery 52, or a portion of a voltage divider, a diode 53 and a grid resistor 54 of the reactance tube 55. When the point 40' at the discriminator becomes sufficiently positive as to overcome the negative potential of the battery the diode conducts, and the reactance tube is made to vary in accordance with the potential across the discriminator. So long as the frequency deviation is so small that it does not result in a large enough voltage at the discriminator to overcome the fixed bias, no action takes place.

From the foregoing description taken in connection with the drawings, it is evident that a trigger device, or an apparatus that operates in a sense as a trigger device is presented and the relation between input frquency and output current is a discontinuous one, so that a small change in frequency makes the circuit jump from one stable condition to another stable condition, a very desirable action.

What is claimed is:

The method of controlling a superheterodyne receiver adapted to receive a modulated carrier signal, comprising the steps of generating a local signal, combining it with said received signal for generating an intermediate frequency signal, developing from said intermediate frequency signal a control signal whose amplitude varies in one sense with increasing intermediate frequency signal frequencies between pre-determined limiting frequencies and in the opposite sense for increasing intermediate frequencies outside said limits and shifting the frequency of the local oscillator in response to the amplitude of said control signals varying with said first sense in a sense opposite to and with greater magnitude than the deviation of the carrier causing said variation.

JOHN MARTIN BORST.

REFERENCES CITED

The following references are of record in the file of this patent:

UNITED STATES PATENTS

| Number | Name | Date |
|---|---|---|
| 2,100,733 | Case | Nov. 30, 1937 |
| 2,121,103 | Seeley | June 21, 1938 |
| 2,205,762 | Hansell | June 25, 1940 |
| 2,272,401 | Chaffee | Feb. 10, 1942 |
| 2,362,000 | Tunick | Nov. 7, 1944 |
| 2,363,650 | Crosby | Nov. 28, 1944 |